UNITED STATES PATENT OFFICE 2,321,234

ORGANIC SOLUTION OF FORMALDEHYDE-UREA REACTION PRODUCTS

John A. Murray and Andrew W. Kassay, Toledo, Ohio, assignors, by mesne assignments, to Libbey-Owens-Ford Glass Company, a corporation of Ohio No Drawing. Continuation of application Serial No. 207,546, May 12, 1938. This application May 14, 1942, Serial No. 443,012. In Canada May 12, 1939

3 Claims. (Cl. 260—29)

This application is a continuation of application Ser. No. 207,546 filed May 12, 1938.

Formaldehyde-urea resins are extensively used for the manufacture of molded articles, because it is possible to produce pure white or delicately tinted articles therefrom. Such articles cannot be produced from phenolic resins because of their inherent dark color. Articles made from formaldehyde-urea resins are also superior to articles from phenolic resins in the resistance of their surfaces to the deteriorating action of light. Formaldehyde-urea products, like products from other thermosetting resins, have the highly desirable properties of insolubility in all solvents and infusibility.

The properties that make formaldehyde-urea resins useful for the production of molded articles would make them at least as useful for the production of lacquers were it not for certain defects of formaldehyde-urea lacquers that have heretofore been regarded as incurable. Formaldehyde-urea lacquers that have been produced in the past form colorless films that are unexcelled in their infusibility, insolubility, and light resistance, but the lacquers are too viscous and not sufficiently compatible. The viscosity of the lacquers is such that they must be thinned out with excessive quantities of a volatile solvent before they can be readily applied as coatings. When such a lacquer is thinned out to the desired viscosity and applied in the form of a coating, an excessively large portion of the resulting coating consists of a volatile solvent which evaporates and leaves only a relatively thin coating of non-volatile material. Thus there is a wasteful loss of solvent by evaporation, and an excessive number of coats must be applied to produce a coating layer of the desired thickness.

The high viscosity of these lacquers is disadvantageous not only because of the excessive quantities of thinning solvents that are required, but also because resort must often be had to expensive solvents by reason of the limited compatibility of the lacquers with the cheap solvents that are usually employed for thinning. The low compatibility of these lacquers also makes it very difficult to incorporate therewith desirable ingredients such as oil-modified alkyds. The disadvantages of the lacquers have been thought to be incurable because they have been regarded as inherent in organic solutions of formaldehyde-urea compounds.

The principal object of the invention is the economical preparation of formaldehyde-urea lacquers of low viscosity and high compatibility.

More specific objects and advantages are apparent from the description, which merely discloses and illustrates the invention and is not intended to impose limitations upon the claims.

As a result of the present invention it was discovered that the high viscosity of the formaldehyde-urea lacquers produced by prior methods was due to the impossibility of properly controlling the degree to which the formaldehyde-urea reaction progressed in the methods. The high viscosity of the resulting lacquers was due to the advanced stage to which the formaldehyde-urea reaction had been carried in their preparation. The formaldehyde-urea compounds in lacquers prepared in accordance with the present invention are believed to be distinctly different from the formaldehyde-urea compounds in prior lacquers. Possibly they are of a much lower molecular weight.

The nature of the formaldehyde-urea compounds in the present lacquers makes them more compatible as well as less viscous than prior lacquers. The high viscosity that prior lacquers assumed during the last stages of their manufacture made it extremely difficult to remove therefrom the last traces of the free water that is split off during the formaldehyde-urea reaction. Although as much water was removed from these lacquers as it was thought to be possible to remove, there was in fact some water dissolved in them that tended to lower their compatibility with the volatile hydrocarbons commonly employed as thinners.

The process by which formaldehyde-urea lacquers are prepared in accordance with the invention requires the evaporation from the reaction mixture of a large quantity of an organic solvent. The formaldehyde-urea reaction is not completed in a separate step, the preparation of the alcoholic solution of the initial formaldehyde-urea reaction product being immediately followed by the prolonged evaporation of an organic solvent from the reaction mixture. During the evaporation, the formaldehyde-urea reaction is carried to but only to the desired stage.

The temperature and acidity of the mixture are kept low enough so that the formaldehyde-urea reaction proceeds at the desired rate during the evaporation. Preferably, the evaporation is carried out under a vacuum so that the temperature may be kept as low as desired. Thus a characteristic of the process is a prolonged formaldehyde-urea reaction at a relatively low temperature rather than a more rapid formaldehyde-urea reaction at a higher temperature. It should be noted that the formaldehyde-urea reaction can be properly controlled only by controlling the temperature during the whole process. When the alcoholic solution of the original formaldehyde-urea reaction product is prepared, sufficient acid must be employed so that the formaldehyde-urea product can be dissolved in a reasonable period of time at the required low temperature. One mistake that has been made in prior methods of preparing lacquers is the use of excessively high temperatures to cause formaldehyde-urea compounds to dissolve rapidly in organic solvents. Of course the acidity of the reaction mixture in the present process should not be high enough to hasten the formaldehyde-urea reaction unduly. High acidity, like high temperature, may cause the reaction to get out of control.

The evaporation of a large excess of an organic solvent from the reaction mixture is an important feature of the process. The quantity of organic solvent that is evaporated in any specific embodiment of the process is a quantity in excess of the amount of organic solvent that would have to be evaporated before no appreciable moisture content would be found if a sample of the vapor being evolved from the mixture were condensed.

The reaction mixture from which the evaporation takes place may consist simply of an alcoholic solution of the formaldehyde-urea compound, or it may consist of a mixture of the alcoholic solution with one or more immiscible liquids.

The organic solvent that is evaporated in the practice of the present process must be one of the solvents contained in the alcoholic solution. Any immiscible liquid that is mixed with the alcoholic solution may be disregarded in this discussion, because the only function of such a liquid would be to facilitate the evaporation of the alcoholic solution at a low temperature, just as steam distillation facilitates the evaporation of organic compounds at temperatures below their boiling points.

The organic solvent that is evaporated from the alcoholic solution in the practice of the present process must be one that is capable of driving off water from the solution. Organic solvents that are capable of driving water off from a solution are of two types. The first and preferred type of solvent is a solvent having a boiling point substantially above 100° C. The other type of solvent is one that forms with water a solution having a boiling point substantially below the boiling point of the solvent. Both of these types of solvents may be considered capable of driving off water from their solutions, because they form solutions with water which as they evaporate give off a vapor in which the proportion of water to solvent remains higher than the proportion of water in the solution. Thus the concentration of water in the solvent continuously decreases so that the solvent may be said to drive off the water as the evaporation proceeds.

When a procedure embodying the invention is being tried out, successive fractions of the distillate may be collected during the evaporation until a fraction is obtained which has no appreciable moisture content. The process can then be completed by evaporating a further quantity of the organic solvent. Once the procedure has thus been tried out, the quantity of the organic solvent that must be evaporated from the reaction mixture is known, so that the moisture content of successive fractions of the distillate need no longer be determined.

The preferred organic solvent for evaporation from the reaction mixture to drive off the water is n-butanol, which boils at a temperature substantially above 100° C., i. e., at 117° C. The recovery of n-butanol from the distillate is facilitated by the fact that n-butanol is not miscible in all proportions with water so that a layer of water separates from the initial fractions of the distillate and may be discarded. Preferably n-butanol is the only organic solvent in the reaction mixture.

In no case should the reaction mixture contain such a high proportion of water that there is a layer of water which does not dissolve in the organic solvents, because the formaldehyde-urea compound dissolved in such a layer of water is likely to harden into a lump.

When n-butanol is used as the organic solvent and dimethylol urea as the initial formaldehyde-urea reaction product, the medium in which one part of dimethylol urea is to be dissolved preferably comprises about three parts of n-butanol so that it is unnecessary to add further n-butanol during the evaporation. The evaporation of the n-butanol is then continued until less than about one part of the n-butanol remains in the solution, because evaporation of about two parts of the n-butanol is required before a condensed sample of the vapor would be found to contain no appreciable content of the water split off in the formaldehyde-urea reaction.

The medium comprising three parts of n-butanol in which one part of dimethylol urea is to be dissolved should contain an additional quantity of n-butanol unless the dimethylol urea is dry. This additional quantity of n-butanol must be sufficient to drive off all the water contained in the dimethylol urea, so that after a quantity of water has been driven off from the reaction mixture equal to the quantity of free water that was initially introduced along with the dimethylol urea, about three parts of n-butanol will still remain in the reaction mixture.

In the commercial preparation of dimethylol urea a final mother liquor is ordinarily obtained which consists of 50 per cent dimethylol urea and 50 per cent water. This mother liquor can be added directly to the organic solvent in the present process if additional solvent is evaporated to take care of the free water in the mother liquor.

Preferably, the evaporation of n-butanol and water is carried out under a vacuum, and sufficient acid is used with the dimethylol urea to permit it to be dissolved in about one-half hour (from one-quarter to three-quarters hour) at about 50° C. Organic acids are more satisfactory than inorganic acids for use in preparing the alcoholic solution.

One defect of prior methods of preparing formaldehyde-urea lacquers was that they included an evaporation step in which the proportion of organic solvent to formaldehyde-urea reaction product was substantially less than the proportion of organic solvent to formaldehyde-urea reaction product at the start of the evaporation step in the present process. As the result of the substantially greater proportion of the organic solvent to formaldehyde-urea reaction product in the present process, the concentration of water in the solution during the evaporation step is substantially less in the present process than in prior methods of preparing formaldehyde-urea lacquers. The water referred to is the water that is split off during the formaldehyde-urea reaction as hereinbefore described. In the present process the concentration of water in the solution not only is low during the initial stages of the evaporation, but decreases during the remainder of the evaporation step as the water is driven off by the evaporation of the organic solvent.

It is explained hereinbefore that if a layer of water is allowed to separate from the reaction mixture at the beginning of the evaporation step, the formaldehyde-urea compound dissolved in such a layer of water is likely to harden into a lump, the reason being that a formaldehyde-urea reaction product hardens much more rapidly in aqueous solution than in organic solution. Thus, in prior processes of preparing formaldehyde-urea lacquers, the substantially greater concentration of water in the solution during the evaporation accelerated the formaldehyde-urea reaction so as to make it impossible to produce lacquers having the low viscosity and high compatibility that are characteristic of lacquers prepared in accordance with the present invention.

In prior methods of preparing such lacquers, since the proportion of organic solvent to formaldehyde-urea reaction product at the beginning of the evaporation step was substantially less than in the present method, it was necessary to add more organic solvent during the evaporation in order to make it possible to evaporate enough organic solvent to drive off the water from the solution. Thus at the start of the evaporation, the solution contained a substantially higher concentration of formaldehyde-urea reaction product in prior methods than in the present method, and the concentration was kept high throughout the evaporation in the prior methods because organic solvent was added only to replace solvent that had already been evaporated from the solution. Since in the prior methods the concentration of formaldehyde-urea reaction product was high not only in the latter stages of evaporation, but also in the initial stages of evaporation, the boiling point of the solution was relatively high and the rate of evaporation of the solvent was relatively low during the initial stages of the evaporation as well as during the latter stages of the evaporation. In the initial stages of the present process when the water is just beginning to be driven off, the solution that is being evaporated is relatively dilute so that the rate of evaporation is relatively high and the boiling temperature is relatively low. In the present process, therefore, the driving off of the water in the initial stages of the evaporation takes place very rapidly and at a relatively low temperature. Example 1 below describes a process in which the temperature of the solution is only 40° C. at the beginning of the evaporation and rises to about 115° C. as the concentration of the solution increases during the evaporation. Prior methods start the evaporation with a relatively concentrated solution so that in such methods the higher temperatures prevail throughout the evaporation. The higher concentration that prevails throughout the evaporation in prior methods makes the evaporation take longer as compared with the evaporation in the present process which starts with a relatively dilute solution. In the initial stages of the evaporation in the prior processes, in which the concentration of water and the temperature are relatively high and the rate of evaporation is relatively low, the formaldehyde-urea reaction advances so far that it is impossible to prepare by such processes a lacquer having the low viscosity and high compatibility of a lacquer prepared in accordance with the present process.

In accordance with the present invention, compositions may be prepared that have never before existed, i. e., film-forming organic solutions of formaldehyde-urea reaction products that are highly compatible with ether or infinitely soluble in toluene, xylene, or the petroleum naphthas that are commonly used as thinners for lacquers. A solution of a formaldehyde-urea reaction product may be considered highly compatible with a solvent when a sample of the solution can be diluted with several times its volume of the solvent without precipitation of the reaction product, and the sample can be regarded as infinitely soluble in a solvent if it can be diluted with about 100 times its volume of the solvent without precipitation. Although prior formaldehyde-urea lacquers are made extremely viscous by dissolving nitro-cellulose solutions therein, lacquers may be prepared in accordance with the invention in which nitro-cellulose solutions of equal concentration can be dissolved without producing a material increase in viscosity. Thus a lacquer embodying the present invention containing about one-half solids, including a substantial proportion of nitro-cellulose and a substantial proportion of formaldehyde-urea, is thin enough to be spread by a brush. When prior lacquers were similarly compounded, an extremely viscous solution was produced. In order to reduce the viscosity of the resulting solution enough to render it brushable it had to be diluted with a large quantity of thinner. Two or more coats of the thinned solution were then required to produce a coating of the thickness that results from one coat of a solution, made from nitro-cellulose and the present lacquer, containing one-half solids. Thus the use of the present lacquer in place of prior lacquers to produce a formaldehyde-urea-nitro-cellulose coating of a given thickness results in a reduction of the number of coats required, and a saving of volatile thinner.

The formaldehyde-urea compound in a lacquer embodying the invention may contain alkoxy groups derived from the alcohol, such as glycol monomethyl ether, n-pentanol, or a lower alcohol, in which the initial formaldehyde-urea reaction product was dissolved in the preparation of the lacquer. However, the formaldehyde-urea compounds in the present lacquers do not need to be reacted with aliphatic alcohols of high molecular weight or oils to give the lacquers the desired compatibility. It is recommended that lacquers embodying the invention contain an amount of n-butanol or n-pentanol that is not less than one-quarter of the weight of dry solids, to give them maximum compatibility. Considerably greater proportions of n-butanol or n-pentanol have been necessary in formaldehyde-urea lacquers heretofore produced in order to give them even mediocre compatibility.

*Example 1*

100 parts of dry dimethylol urea, 300 parts n-butanol, and 1 part of maleic acid are kept at 45–50° C. until the dimethylol urea has dissolved. (If the 100 parts of dimethylol urea are accompanied by 100 parts of free water, 400 instead of 300 parts of n-butanol should be employed.) The dissolving of the dimethylol urea requires from 15 to 45 minutes, depending upon the size of the dimethylol urea particles. The solution is then filtered, if desired, and evaporated as rapidly as possible under a vacuum of 26 to 29 inches to a concentration of about 60 to 65 per cent solids. During the evaporation the temperature rises gradually from about 40° C. to about 115° C. Toluene, petroleum naphtha, or coal tar naphtha is then added to reduce the concentration of the solution to about 45 per cent solids. When the resulting solution is used as a lacquer, it forms a clear film that can be hardened by baking to produce a coating that is remarkably resistant to water. The solution is highly compatible with drying oils and with oil-modified and other alkyds, and is infinitely soluble in ether, toluene, xylene, and the petroleum naphtha that is used for thinning lacquers. Moreover, the viscosity of the solution is not increased like that of prior formaldehyde-urea lacquers by dissolving a nitrocellulose solution therein.

*Example 2*

100 parts of dimethylol urea, 300 parts of methanol, and 1 part of maleic acid are kept at 45°-48° C. until the dimethylol urea has dissolved (15 to 45 minutes). The solution is filtered, and after the addition of 200 parts of n-pentanol the solution is evaporated as rapidly as possible under a vacuum of 15 to 30 inches to a concentration of about 65 per cent solids. The resulting solution may be diluted to about 45 per cent solids with petroleum naphtha if desired.

Various other embodiments of the invention may be devised to meet various requirements.

Having described our invention, we claim:

1. A process of making a substantially anhydrous organic solution of a formaldehyde-urea reaction product that includes preparing a solution by heating together ingredients comprising one part of dimethylol urea, an acidifying agent and not less than about three parts of n-butanol, and evaporating n-butanol from the resulting solution until less than about one part remains, an amount of water not less than the amount of any free water that was present in the ingredients from which the solution was prepared having been removed from the solution before the stage of evaporation is reached in which the amount of the n-butanol used that has not been evaporated is less than about three parts, and the temperature and acidity during the process being such that the reaction is carried to the desired stage.

2. A process of making a substantially anhydrous organic solution of a formaldehyde-urea reaction product that includes preparing a solution by heating together substantially anhydrous ingredients comprising one part of dimethylol urea, an acidifying agent and not less than about three parts of n-butanol, and evaporating n-butanol from the resulting solution until less than about one part remains, the temperature and acidity during the process being such that the reaction is carried to the desired stage.

3. A process of making a substantially anhydrous organic solution of a formaldehyde-urea reaction product that includes preparing a solution by heating together ingredients comprising one part of dimethylol urea, not less than about three parts of n-butanol and a sufficient amount of an acidifying agent to cause the dimethylol urea to dissolve in about one-half hour at about 50° C., and vacuum distilling n-butanol from the resulting solution until less than about one part remains, an amount of water not less than the amount of any free water that was present in the ingredients from which the solution was prepared having been removed from the solution before the stage of evaporation is reached in which the amount of the n-butanol used that has not been evaporated is less than about three parts.

JOHN A. MURRAY.
ANDREW W. KASSAY.